April 7, 1936.  F. H. RAGAN  2,036,297
POWER PRESS
Original Filed July 24, 1931
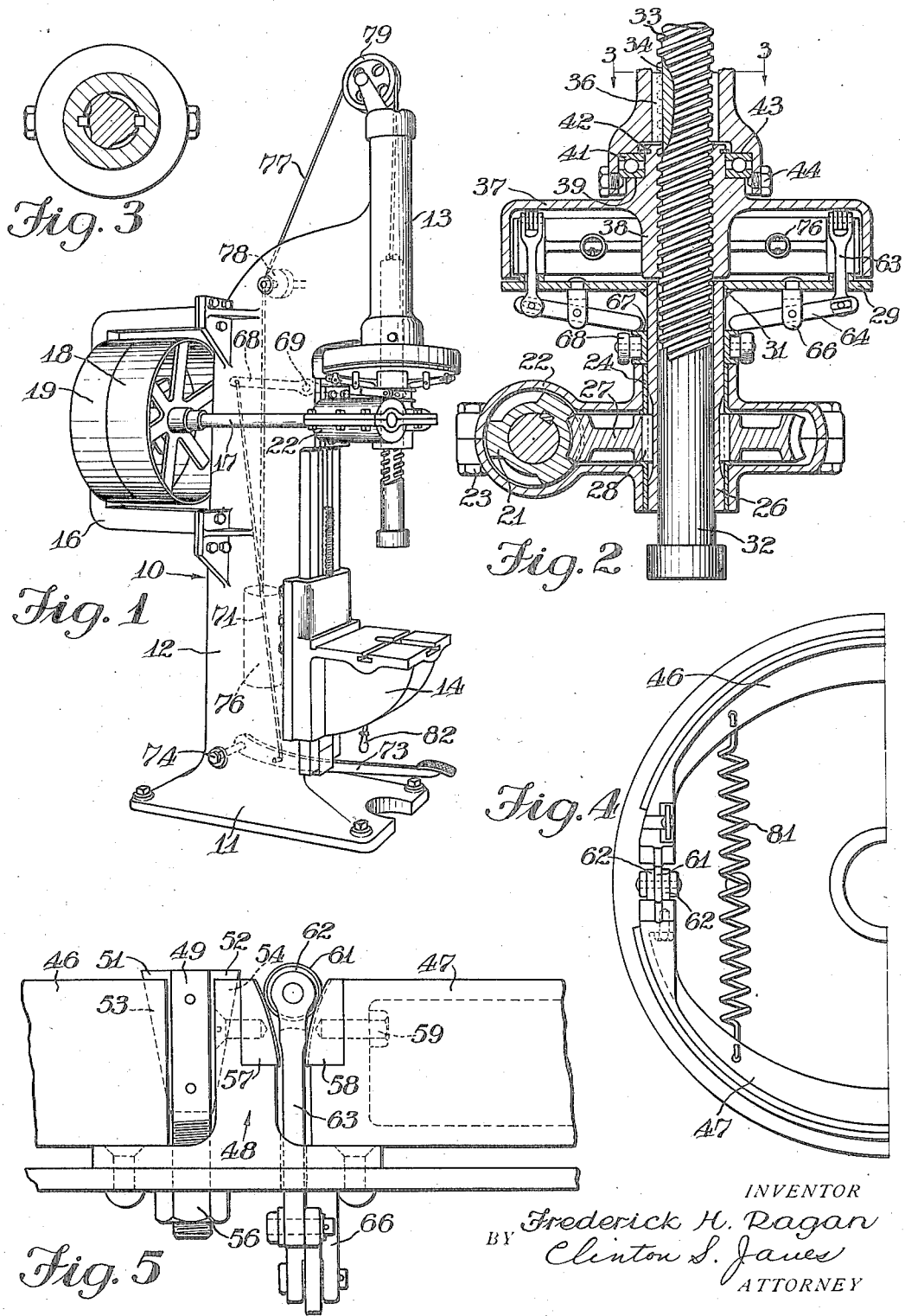
INVENTOR
Frederick H. Ragan
BY Clinton S. Janes
ATTORNEY Patented Apr. 7, 1936

2,036,297

UNITED STATES PATENT OFFICE 2,036,297

POWER PRESS

Frederick H. Ragan, Cleveland, Ohio

Application July 24, 1931, Serial No. 552,888
Renewed December 9, 1933

7 Claims. (Cl. 29—85)

This invention relates to power presses and more particularly to a press having a non-rotatable ram and provided with a flexible or variable control.

It is an object of the present invention to provide a novel power press embodying a flexible easily controlled operating mechanism for a reciprocating ram.

Another object of the invention is to provide such a device which operates by means of a direct screw and nut drive.

Another object is to provide such a device embodying a non-rotatable ram and a nut the rotation of which is controlled by the operator.

Another object is to provide such a device in which the pressure exerted thereby may be in substantially arithmetical proportion with the force exerted by the operator, or may vary with the applied force according to any desired law.

A further object is to provide such a device in which the operating and controlling elements are of simple construction, readily assembled and capable of efficient operation over long periods of use.

Further objects and advantages will be apparent to those skilled in this art from the following description taken in connection with the accompanying drawing in which:—

Fig. 1 is a perspective view of a power press embodying a preferred embodiment of the invention;

Fig. 2 is an enlarged detail in vertical section of the operating mechanism for the ram;

Fig. 3 is a section taken substantially on the line 3—3 of Fig. 2;

Fig. 4 is an enlarged detail of portions of the driving clutch mechanism; and

Fig. 5 is an enlarged detail showing the operating and adjusting mechanism for the movable clutch members.

Referring first to Fig. 1 of the drawing, there is illustrated a press frame 10 comprising a base 11, a vertical column 12 and a guide cylinder 13. The column 12 of the frame is arranged to carry a vertically adjustable work table 14 and a bracket 16 providing an outboard bearing for a horizontal drive shaft 17. Said shaft carries a loose pulley 18 and a fast pulley 19 which is arranged to constantly rotate the shaft from a suitable source of power.

The opposite end of the drive shaft 17 is provided with a worm 21 (Fig. 2) and is journaled in a casing bracket 22 suitably fixed to the column 12 of the frame. The casing 22 is preferably split horizontally and held together by means such as bolts 23.

Casing 22 is provided with vertical bearings 24 in alignment with the cylindrical guide 13 and arranged to receive a power member in the form of a hollow shaft 26 having a worm wheel 27 fixed thereon as by means of keys 28, and arranged to mesh with the worm 21. The power member 26 extends above the casing 22 and carries at its upper end a driving clutch plate 29 suitably fixed thereto as by welding as indicated at 31.

A cylindrical ram 32 is journaled within the power member 26 and the cylindrical guide 13, being threaded for the major portion of its length as indicated at 33 and having spline grooves 34 formed therein for the full length of its stroke and arranged to cooperate with keys 36 fixed in the lower end of the cylindrical guide 13. A control member 37 for the ram is provided in the form of a rotatable clutch drum having a hub 38 threaded on said ram and formed with a seat 39 for a thrust bearing 41 suitably retained thereon as by means of a split ring 42. The thrust bearing 41 is adapted to fit in a recess 43 in the bottom of the cylindrical guide 13, and is adapted to be retained therein by means such as the studs 44 mounted in the lower edge of said guide.

In order to drive the control member 37 from the power member 26, movable friction clutch shoes 46 and 47 (Figs. 4 and 5) are mounted on the driving plate 29 and arranged to engage the inner periphery of the control member. These clutch shoes are anchored at one end to the driving plate 29 through a bracket 48, said anchorage being preferably adjustable to take up wear. As illustrated, this connection is formed by adjusting members 49 having wedge-shaped lateral extensions 51 and 52 arranged to engage in correspondingly inclined slots 53 and 54 in the shoes 46 and 47 and the brackets 48 respectively. The adjusting members 49 have threaded portions extending through the driving plate 29 and provided with nuts 56 for suitably positioning and retaining said members.

The free ends of the clutch members are arranged to be moved into and out of engagement with the inner periphery of the control member 37 by means which are continuously under the control of the operator whereby the rotative force applied to the control member may be varied in order to control the operation of the ram 32. As illustrated, this control mechanism includes hardened steel cam blocks 57 and 58 mounted on the brackets 48 and the free ends of the shoes 46 and 47 and suitably retained thereon as by means of studs 59 and arranged to be wedged apart by rollers 61 and 62 loosely pivoted in the ends of clevis rods 63. The rollers 61 are of slightly larger diameter than the rollers 62, and the surfaces of the blocks 57 and 58 are correspondingly ribbed and grooved respectively so that the rollers 61 contact the blocks 57 only while the rollers 62 contact the blocks 58 only, as shown in Fig. 4.

The clevis rods 63 extend through the driving plate 29 and are suitably connected to levers 64, fulcrumed at 66 to said driving plate, and adapted to be engaged at their free ends by a collar 67 slidably mounted on the power member 26. A shifting fork 68 for said collar is suitably fulcrumed on the column 12 as indicated at 69, and arranged to be operated through a link 71 from a foot pedal 73 hinged at 74 to the base 11 of the press in a convenient location for actuation by the operator.

The ram 32 is yieldably urged toward its upper or idle position by suitable means such as a weight 76 suspended by a cable 77 running over sheaves 78 and 79 and suitably connected to the upper end of said ram. The clutch shoes 46 and 47 are normally retracted from contact with the control member 37 by means such as springs 81 so that the control member 37 can rotate freely backward and allow such return movement of the ram 32 to its normal position.

In operation, the work is placed on the table 14 which is adjusted to a suitable height by means of the hand wheel 82. Pressure on the pedal 73 thereupon causes the clutch shoes 46 and 47 to be expanded into engagement with the control member 37 causing rotation thereof with a force corresponding to the pressure applied to the foot pedal. The rotation of the control member 37 causes the ram 32 to exert a pressure on the work by virtue of the threaded connection between the control member and ram. Release of the treadle 73 frees the control member 37, allowing the ram 32 to be raised by the weight 76. It will be understood that although comparatively large forces may be transmitted to the control member, such forces may be easily and accurately regulated by appropriate variations of pressure on the foot pedal 73.

It will furthermore be noted that the character of the control of the clutch shoes 46 and 47 may be varied by the use of suitable contours on the cam blocks 57 and 58. Thus, if the cam surfaces are substantially straight, the ratio between the controlling forces and the pressure of the ram will be substantially a simple arithmetical proportion depending on the angle thereof. However, if these surfaces are provided with curved contours, as illustrated, the pressure of the ram may vary with respect to the controlling forces according to any desired law. The use of interchangeable blocks of various contours thus enables the press to be readily adapted to various forms of work.

Although but one form of the invention has been shown and described in detail, it will be understood that various changes may be made in the proportions and arrangements of the parts and certain features used without other features thereof without departing from the spirit of the invention as defined in the claims appended hereto.

What is claimed is:

1. In a power press a frame, a power member journaled therein and arranged to be driven from a source of power, a ram slidably mounted within the power member and adapted to be guided thereby, said frame having a portion forming a guide for said ram and splined thereto, a control member in the form of a clutch drum having a hub threaded on said ram, a thrust bearing mounted on said hub, said frame having a recess adapted to form a seat for said thrust bearing, means for retaining the thrust bearing on said hub and in said recess, and friction means continuously under the control of the operator including friction clutch means connected to rotate with the power member and to cooperate with said drum for rotating the control member from said power member.

2. In a power press, a frame, a power member journaled therein, a ram splined in said frame, a control member threaded on said ram, a friction clutch under the control of the operator for driving the control member from the power member in a direction to advance the ram, yielding means for retracting the ram, and a single bearing on said frame for preventing longitudinal movement of the control member in either direction.

3. In a power press a longitudinally movable ram, a control member threaded thereto, a constantly rotating power member, means for transmitting power from the power member to cause relative rotation between the control member and ram, and manual controlling means for said transmitting means, said controlling means including elements whereby the ratio of the controlling forces to the pressures developed by the ram may be arranged to vary according to any desired one of several rules.

4. In a power press, a longitudinally movable ram, a control member threaded thereto, a constantly rotating power member, means for transmitting the power from the power member to cause relative rotation between the control member and ram, and manual controlling means for said transmitting means, said controlling means including interchangeable cam members whereby the ratios of control forces to output pressures may vary according to any selected rule of operation.

5. In a power press, a frame, a power member journaled therein and arranged to be driven from a source of power, a ram slidably mounted within the power member and adapted to be guided thereby, said frame having a portion forming a guide for said ram and splined thereto, a control member in the form of a clutch drum having a hub threaded on said ram, a thrust bearing mounted on said hub, and frictional means continuously under the control of the operator for rotating the control member from said power member, said rotating means including friction members rotated within the control member, means for expanding said friction members into engagement with said control member to transmit rotation thereto and means for adjusting said friction members to compensate for wear.

6. In a power press, a frame, a power member journalled therein and arranged to be driven from a source of power, a ram slidably mounted within the power member and adapted to be guided thereby, said frame having a portion forming a guide for said ram and splined thereto, a control member in the form of a clutch drum having a hub threaded on said ram, a thrust bearing mounted on said hub, and frictional means continuously under the control of the operator for rotating the control member from said power member, said rotating means including friction means rotated in juxtaposition with the control member and means for urging said friction means into engagement with said control member to transmit rotation thereto.

7. In a power press, a frame, a power member journalled therein and arranged to be driven from a source of power, a ram slidably mounted within the power member and adapted to be guided thereby, said frame having a portion forming a guide for said ram and splined thereto, a control member in the form of a clutch drum having a hub threaded on said ram, a thrust bearing mounted on said hub, and means continuously under the control of the operator for rotating the control member from said power member, said rotating means including elements rotated in juxtaposition with the control member, means for urging said elements into engagement with the control member to transmit rotation thereto, and means for adjusting said elements to compensate for wear.

FREDERICK H. RAGAN.